US009934678B2

(12) United States Patent
Hirakawa et al.

(10) Patent No.: US 9,934,678 B2
(45) Date of Patent: Apr. 3, 2018

(54) REMOTE CONTROLLER AND REMOTE CONTROL SYSTEM

(71) Applicant: Sumitomo Electric Industries, Ltd., Osaka-shi (JP)

(72) Inventors: Mitsuru Hirakawa, Osaka (JP); Sei Teki, Osaka (JP)

(73) Assignee: SUMITOMO ELECTRIC INDUSTRIES, LTD., Osaka-shi (JP)

( * ) Notice: Subject to any disclaimer, the term of this patent is extended or adjusted under 35 U.S.C. 154(b) by 117 days.

(21) Appl. No.: 14/890,885

(22) PCT Filed: May 12, 2014

(86) PCT No.: PCT/JP2014/062586
§ 371 (c)(1),
(2) Date: Nov. 12, 2015

(87) PCT Pub. No.: WO2014/185377
PCT Pub. Date: Nov. 20, 2014

(65) Prior Publication Data

US 2016/0110995 A1 Apr. 21, 2016

(30) Foreign Application Priority Data

May 13, 2013 (JP) ................................ 2013-101492

(51) Int. Cl.
*G05B 11/01* (2006.01)
*G08C 17/02* (2006.01)

(52) U.S. Cl.
CPC .......... *G08C 17/02* (2013.01); *G08C 2201/11* (2013.01); *G08C 2201/112* (2013.01); *G08C 2201/114* (2013.01)

(58) Field of Classification Search
None
See application file for complete search history.

(56) References Cited

U.S. PATENT DOCUMENTS 9,551,327 B2 * 1/2017 Kaneko .................. G08C 17/02
2002/0095588 A1 * 7/2002 Shigematsu ......... G06Q 20/367 713/186

(Continued)

FOREIGN PATENT DOCUMENTS

JP 4225792 B2 2/2009
JP 2011-172111 A 9/2011

(Continued)

OTHER PUBLICATIONS

International Search Report in International Application No. PCT/JP2014/062586, dated Aug. 12, 2014.

*Primary Examiner* — George Bugg
*Assistant Examiner* — Renee Dorsey
(74) *Attorney, Agent, or Firm* — Venable LLP; Michael A. Sartori; Laura G. Remus

(57) ABSTRACT

A remote controller 101 includes: an operation unit 11; a power generating unit 12 that generates electric power by operation on the operation unit 11; a signal generating unit 13 that operates by using the electric power generated by the power generating unit 12 and is able to output a signal of a kind corresponding to the content of each operation on the operation unit 11; a storage unit 15 that operates by using the electric power generated by the power generating unit 12 and nonvolatilely stores the content of an output signal of the signal generating unit 13; and a transmission control unit 14 that operates by using the electric power generated by the power generating unit 12 and transmits a wireless signal including information corresponding to the content of the output signal stored in the storage unit 15 when the operation on the operation unit 11 satisfies a predetermined condition.

7 Claims, 6 Drawing Sheets

(56) References Cited

U.S. PATENT DOCUMENTS

| | | | | |
|---|---|---|---|---|
| 2004/0263377 | A1* | 12/2004 | Risi | G08C 17/00 341/175 |
| 2004/0266419 | A1* | 12/2004 | Arling | G08C 17/00 455/420 |
| 2008/0072042 | A1* | 3/2008 | Okuyama | G06F 21/57 713/164 |
| 2009/0007596 | A1* | 1/2009 | Goldstein | A61B 5/6817 63/1.11 |
| 2010/0134240 | A1* | 6/2010 | Sims | G08C 17/02 340/5.1 |
| 2011/0148341 | A1* | 6/2011 | Lee | H01M 10/465 320/101 |
| 2012/0080944 | A1* | 4/2012 | Recker | H02J 9/02 307/25 |
| 2012/0139698 | A1* | 6/2012 | Tsui | G08C 17/02 340/5.54 |
| 2013/0215331 | A1* | 8/2013 | Carmichael | H04N 5/4403 348/734 |
| 2014/0267931 | A1* | 9/2014 | Gilson | H04N 5/4403 348/734 |

FOREIGN PATENT DOCUMENTS

| | | | |
|---|---|---|---|
| JP | 4824277 | B2 | 11/2011 |
| JP | 2012-239145 | A | 12/2012 |

* cited by examiner

FIG. 6

| | |
|---|---|
| REMOTE CONTROLLER ID | INPUT NUMBER |

REMOTE CONTROLLER AND REMOTE CONTROL SYSTEM

TECHNICAL FIELD

The present invention relates to a remote controller and a remote control system, and particularly, relates to a remote controller and a remote control system which utilize energy harvesting.

BACKGROUND ART

There has been developed an instrument that operates by using electric power generated by energy harvesting for harvesting minute energy from a surrounding environment such as light, heat, and oscillation.

For example, Japanese Patent Publication No. 4824277 (Patent Literature 1) discloses the following technique.

That is, a sensor system includes: at least one voltage generator that converts nonelectric energy into electric energy; at least one energy storage unit connected to a back position of the voltage generator; at least one voltage converter connected to the energy storage unit so that an output signal of the self matches the operation performed by a processor control unit; at least one sensor; and at least one transmission unit that performs wireless transmission of a transmission telegram which is generated by the processor control unit and which includes at least one measured value of the at least one sensor.

In the sensor system, there is provided a semiconductor timer circuit configured by the ULP technique that realizes a long-hour active cycle in the case where the energy supply is imperfect.

The timer circuit is triggered when the voltage of the at least one energy storage unit reaches a predetermined level. After a predetermined time since the time point when the timer circuit is triggered, the timer circuit starts the processor control unit and the transmission unit so as to transmit at least one transmission telegram.

The at least one voltage generator is configured in a size in which the voltage generator cannot generate sustainably-operating electric power, even when the voltage generator attempts to directly drive the processor control unit. The transmission telegram further includes one identification code.

CITATION LISTS

Patent Literatures

Patent Literature 1: Japanese Patent Publication No. 4824277

Patent Literature 2: Japanese Patent Publication No. 4225792

SUMMARY OF INVENTION

Technical Problem

In the case of utilizing energy harvesting in the remote controller, for example, the button pressing energy can be converted to electric energy, and the information of the pressed button can be wirelessly transmitted to another device.

It is desired to provide an excellent remote control system, by improving the function, convenience, and the like of the remote controller that utilizes the energy harvesting.

The present invention has been made to solve the above problem. An object of the present invention is to provide a remote controller capable of providing an excellent remote control system which utilizes energy harvesting, and a remote control system that includes the remote controller.

Solution to Problem (1) In order to solve the above problem, a remote controller according to a certain aspect of the present invention includes: an operation unit; a power generating unit that generates electric power by operation on the operation unit; a signal generating unit that operates by using the electric power generated by the power generating unit and is able to output a signal of a kind corresponding to the content of each operation on the operation unit; a storage unit that operates by using the electric power generated by the power generating unit and nonvolatilely stores the content of an output signal of the signal generating unit; and a transmission control unit that operates by using the electric power generated by the power generating unit and transmits a wireless signal including information corresponding to the content of the output signal stored in the storage unit when the operation on the operation unit satisfies a predetermined condition.

(7) In order to solve the above problem, a remote control system according to a certain aspect of the present invention includes a remote controller that transmits a wireless signal, and a receiving unit that receives the wireless signal from the remote controller and controls an instrument based on information included in the received wireless signal. The remote controller includes: an operation unit; a power generating unit that generates electric power by operation on the operation unit; a signal generating unit that operates by using the electric power generated by the power generating unit and is able to output a signal of a kind corresponding to the content of each operation on the operation unit; a storage unit that operates by using the electric power generated by the power generating unit and nonvolatilely stores the content of an output signal of the signal generating unit; and a transmission control unit that operates by using the electric power generated by the power generating unit and transmits a wireless signal including information corresponding to the content of the output signal stored in the storage unit when the operation on the operation unit satisfies a predetermined condition.

The present invention can not only realize a remote controller equipped with the above characteristic processing unit (such as the signal generating unit and the transmission control unit), but can also realize a remote control method which uses a characteristic process as a step, and can realize a program for making a computer execute the step.

The characteristic processing unit can be also realized as a semiconductor integrated circuit that realizes a part or a whole of processes that the processing unit performs.

In the case of considering that there is a possibility of adding and changing categories, it is advisable that a method claim and a program claim are additionally noted as a last of a copy of whole claims described in embodiments or as an additional note, instead of describing the above formatted report (in addition to the formatted report).

Advantageous Effects of Invention

According to the present invention, an excellent remote control system that utilizes energy harvesting can be provided.

BRIEF DESCRIPTION OF DRAWINGS

FIG. 6 is a diagram illustrating an example of information to be transmitted by the remote controller according to the second embodiment of the present invention.

DESCRIPTION OF EMBODIMENTS

Figure 1:
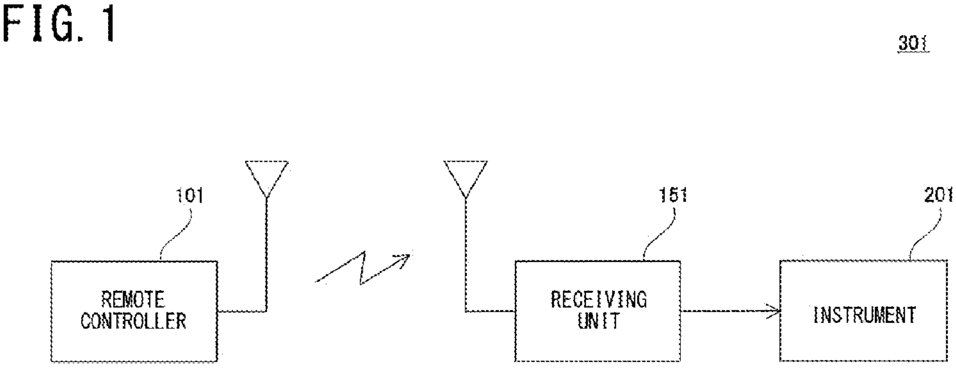
FIG. 1 is a diagram illustrating a configuration of a remote control system according to a first embodiment of the present invention.

First, contents of embodiments of the present invention will be described by listing.

(1) In order to solve the above problem, a remote controller according to a certain aspect of the present invention includes: an operation unit; a power generating unit that generates electric power by operation on the operation unit; a signal generating unit that operates by using the electric power generated by the power generating unit and is able to output a signal of a kind corresponding to the content of each operation on the operation unit; a storage unit that operates by using the electric power generated by the power generating unit and nonvolatilely stores the content of an output signal of the signal generating unit; and a transmission control unit that operates by using the electric power generated by the power generating unit and transmits a wireless signal including information corresponding to the content of the output signal stored in the storage unit when the operation on the operation unit satisfies a predetermined condition.

As described above, the remote controller according to a certain aspect of the present invention stores the content of the operation on the operation unit into the storage unit, by using the electric power generated by the operation. When the content of the operation on the operation unit satisfies a predetermined condition, the remote controller transmits the wireless signal including the information corresponding to the stored operation content, by using the electric power generated by the power generating unit, for example. By this configuration, transmitting a wireless signal each time when operation occurs on the operation unit can be avoided, and radio wave interference due to the transmission of the wireless signal can be reduced while effectively using the electric power generated by the power generating unit. Therefore, an excellent remote control system that utilizes energy harvesting can be provided.

(2) Preferably, the storage unit further stores reference information. When the operation on the operation unit satisfies a predetermined condition, the transmission control unit preferably compares the content of the output signal with the reference information, the content of the output signal and the reference information being stored in the storage unit. In the case where a result of the comparison satisfies a predetermined condition, the transmission control unit transmits the wireless signal.

With this configuration, concerning the content of a series of operations on the operation unit, a higher-level condition can be set for transmitting a wireless signal. Therefore, the remote controller can exhibit a high performance. Further, as compared with the configuration in which a condition of the content of a series of operations on the operation unit is set to the receiving unit of the wireless signal, for example, a data length of the information transmitted from the remote controller to the receiving unit can be shortened. Therefore, the radio wave interference can be more reduced. Further, because the content of a series of operations on the operation unit is not transmitted to the outside of the remote controller, security can be enhanced.

(3) Preferably, when the operation on the operation unit satisfies a predetermined condition, the transmission control unit transmits a wireless signal including the content of the output signal stored in the storage unit.

As described above, instead of setting in the remote controller a transmission condition of a wireless signal concerning a relationship between the content of a series of operations on the operation unit and the reference information, a condition of the content of a series of operations on the operation unit can be set in the receiving unit of the wireless signal, for example. Therefore, the process of the remote controller can be simplified, and the power generation condition and the like in the remote controller can be reduced.

(4) Preferably, the remote controller further includes an erasing unit that erases the content of the output signal stored in the storage unit, in response to completion of transmission of the wireless signal by the transmission control unit.

With this configuration, unnecessary information can be prevented from being kept held in the storage unit, and efficiency of using the storage region of the storage unit can be enhanced. Further, in the case of performing a comparison using the reference information as described above, user input information of a number and the like can be prevented from remaining in the remote controller, and security can be improved.

(5) Preferably, the operation unit includes a plurality of buttons having different sizes, and the predetermined condition is that the button having a larger size is pressed.

As described above, by configuring the button that becomes a trigger of the wireless signal transmission operation to be larger than other buttons, the power generating unit can generate larger electric power, and the wireless signal transmission operation can be executed more securely.

(6) More preferably, the reference information is password information, and the transmission control unit transmits the wireless signal in the case where the content of the output signal stored in the storage unit coincides with the password information.

By this configuration, it becomes possible to apply a remote control system to a system that requires high security.

(7) In order to solve the above problem, a remote control system according to a certain aspect of the present invention includes a remote controller that transmits a wireless signal, and a receiving unit that receives the wireless signal from the remote controller and controls an instrument based on information included in the received wireless signal. The remote controller includes: an operation unit; a power generating unit that generates electric power by operation on the operation unit; a signal generating unit that operates by using the electric power generated by the power generating unit and is able to output a signal of a kind corresponding to the content of each operation on the operation unit; a storage unit that operates by using the electric power generated by the power generating unit and nonvolatilely stores the content of an output signal of the signal generating unit; and a transmission control unit that operates by using the electric power generated by the power generating unit and transmits a wireless signal including information corresponding to the content of the output signal stored in the storage unit when the operation on the operation unit satisfies a predetermined condition.

As described above, the remote controller according to a certain aspect of the present invention stores the content of the operation on the operation unit into the storage unit, by using the electric power generated by the operation. When the content of the operation on the operation unit satisfies a predetermined condition, the remote controller transmits the wireless signal including the information corresponding to the stored operation content, by using the electric power generated by the power generating unit, for example. By this configuration, transmitting a wireless signal each time when operation occurs on the operation unit can be avoided, and radio wave interference due to the transmission of the wireless signal can be reduced while effectively using the electric power generated by the power generating unit. Therefore, an excellent remote control system that utilizes energy harvesting can be provided.

Hereinafter, embodiments of the present invention will be described with reference to the drawings. In the drawings, identical or corresponding portions are attached with the same reference symbols, and the description thereof will not be repeated.

First Embodiment

FIG. 1 is a diagram illustrating a configuration of a remote control system according to a first embodiment of the present invention.

Referring to FIG. 1 a remote control system 301 includes a remote controller 101 and a receiving unit 151.

The remote controller 101 transmits a wireless signal to the receiving unit 151 in accordance with user's operation.

The receiving unit 151 receives the wireless signal transmitted from the remote controller 101, and controls an instrument 201 based on the information included in the received wireless signal. The receiving unit 151 may include the instrument 201 that is an object to be controlled.

The remote controller 101 utilizes energy harvesting which harvests minute energy from a surrounding environment such as light, heat, and oscillation, and operates by using electric power generated by the energy harvesting. Specifically, the remote controller 101 operates by using the electric power obtained by user's operation on the operation unit of the remote controller 101.

Figure 2:
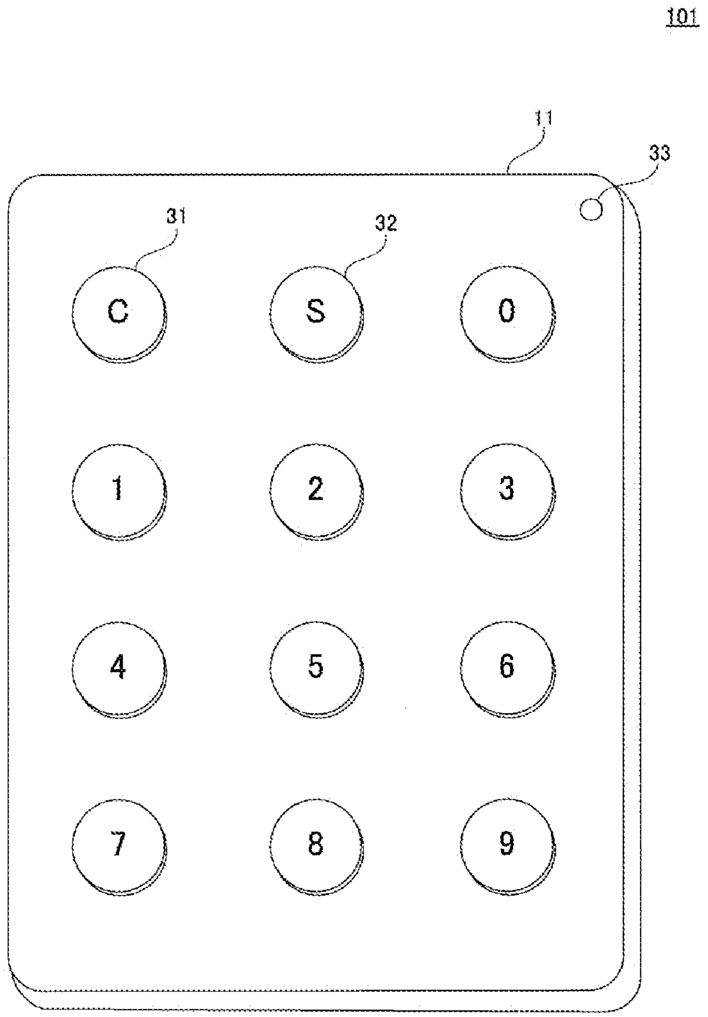
FIG. 2 is a diagram illustrating an example of an operation unit of a remote controller according to the first embodiment of the present invention.

FIG. 2 is a diagram illustrating an example of an operation unit of a remote controller according to the first embodiment of the present invention.

Referring to FIG. 2, an operation unit 11 of the remote controller 101 includes number buttons 0 to 9, a clear button 31, a transmission button 32, and an LED 33.

The user operates the remote controller 101 by pressing each button in the operation unit 11.

The LED 33 is kept lit during a constant period, and notifies the user that the operation is successful, in the case where the strength of pressing the button in the operation unit 11 is sufficient.

The operation unit 11 is not limited to be configured to include the buttons, and may be configured to include a dial and the like. The operation unit 11 is not limited to be configured to include the number buttons, and may be configured to include alphabet buttons.

Figure 3:
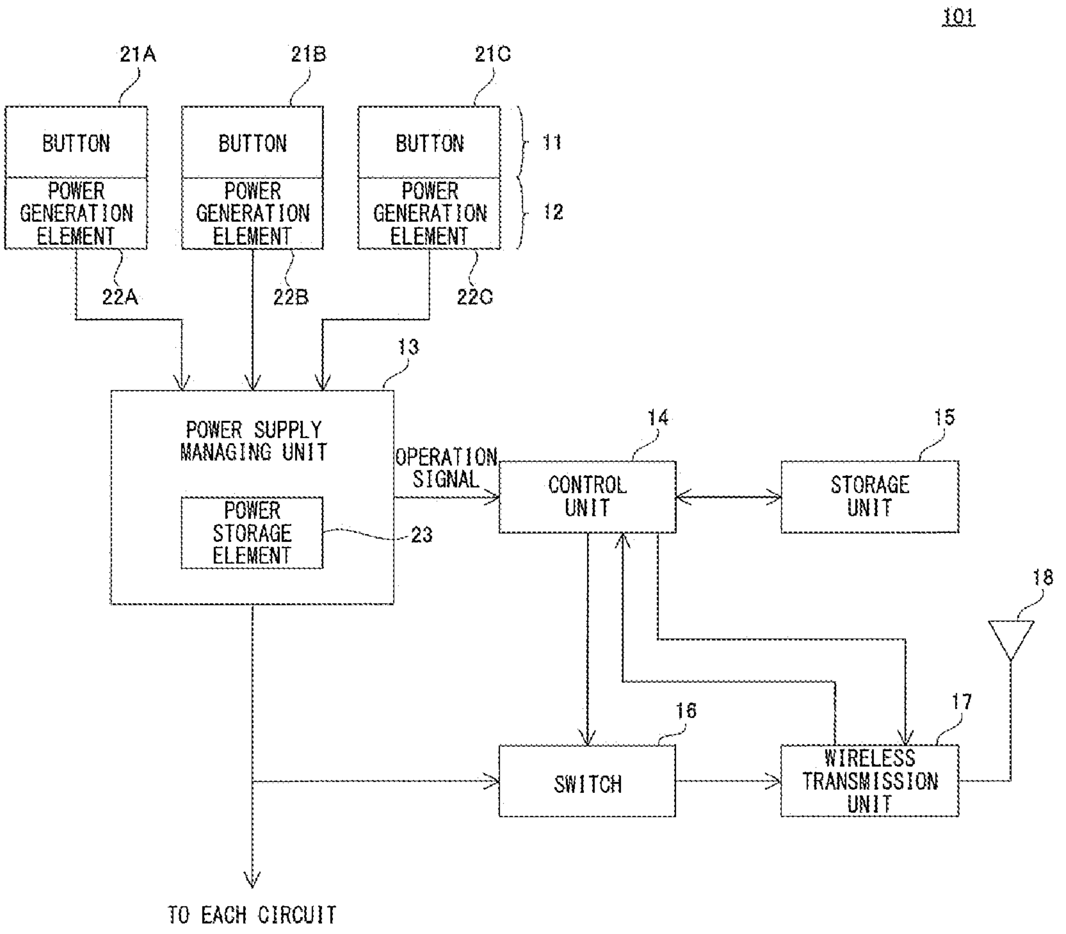
FIG. 3 is a diagram illustrating a configuration of the remote controller according to the first embodiment of the present invention.

FIG. 3 is a diagram illustrating a configuration of the remote controller according to the first embodiment of the present invention.

Referring to FIG. 3, the remote controller 101 includes the operation unit 11, a power generating unit 12, a power supply managing unit (a signal generating unit) 13, a control unit (a transmission control unit and an erasing unit) 14, a storage unit 15, a switch 16, a wireless transmission unit 17, and an antenna 18. The power supply managing unit 13 includes a power storage element 23.

The operation unit 11 includes a plurality of buttons, for example. FIG. 3 representatively illustrates three buttons 21A, 21B, and 21C.

The power generating unit 12 generates electric power by operation on the operation unit 11. The power generating unit 12 includes power generating elements 22A, 22B, and 22C that are provided corresponding to the buttons 21A, 21B, and 21C, respectively.

Hereinafter, each of the buttons 21A, 21B, and 21C will be also referred to as a button 21. Each of the power generating elements 22A, 22B, and 22C will be also referred to as a power generating element 22.

The power generating element 22 is provided at a lower part of the corresponding button 21, generates electric power from energy generated by pressing the corresponding button 21, and outputs the electric power to the power supply managing unit 13.

Specifically, the power generating unit 12 may generate electric power by a change with time of a magnetic flux using a spring, a permanent magnet, and an induction coil, like the technique described in Japanese Patent Publication No. 4225792 (Patent Literature 2), for example. Further, pressing of the button 21 by a user causes the power generating unit 12 to generate stress for elastically deforming the power generating element 22 formed by a piezoelectric element, a magnetostrictive material, or a super-magnetostrictive material, and then to take out electric power from the power generating element 22 by the elastic deformation. For the magnetostrictive material and the super-magnetostrictive material, there are known an Fe—Co alloy, an Fe—Ga alloy, and a Tb—Dy—Fe alloy, for example. However, an arbitrary material having a reverse magnetostrictive effect may be used.

As described above, an arbitrary system of converting mechanical energy, generated by the pressing of the button 21 by a user, into electric energy via various physical phenomena can be applied to the power generating unit 12.

The power storage element 23 in the power supply managing unit 13 is a secondary buttery or a capacitor, for example. The power storage element 23 stores energy by the electric power supplied from the power generating unit 12, and supplies electric power to each circuit in the power supply managing unit 13 and in the remote controller 101.

Further, the power supply managing unit 13 monitors the state of the power storage element 23, and prevents overcharge and overdischarge of the power storage element 23. More specifically, when the voltage of the power storage element 23 rises and reaches a predetermined threshold value, the power supply managing unit 13 starts power supply to each circuit, and when the voltage of the power storage element 23 falls and reaches a predetermined threshold value, the power supply managing unit 13 stops power supply to each circuit, for example.

Further, each circuit in the remote controller 101 can operate by using the electric power generated by latest operation on the operation unit 11, and can also operate by using the electric power generated by the past operation on the operation unit 11.

The switch 16 switches between outputting electric power supplied from the power storage element 23 to the wireless transmission unit 17 and non-outputting the electric power to the wireless transmission unit 17.

The wireless transmission unit 17 operates by using the electric power supplied from the power storage element 23 via the switch 16, generates a wireless signal including the information received from the control unit 14, and transmits the wireless signal to the receiving unit 151 via the antenna 18.

The power supply managing unit 13 operates by using the electric power generated by the power generating unit 12, and can output to the control unit 14 an operation signal of a kind corresponding to the content of each operation on the operation unit 11.

More specifically, the power supply managing unit 13 can determine the power generating unit 12 as a supply source of the electric power. The power supply managing unit 13 generates an operation signal indicating the button 21 pressed in the operation unit 11, and outputs the operation signal to the control unit 14. Specifically, the operation signal is a signal indicating which one of 0 to 9 number buttons is pressed, or which one of the clear button 31 and the transmission button 32 is pressed.

The control unit 14 is a CPU, for example, operates by using the electric power generated by the power generating unit 12, and controls each unit in the remote controller 101.

For example, the control unit 14 performs a process according to the content of the operation signal received from the power supply managing unit 13, that is, a process according to the content of the operation on the operation unit 11.

The control unit 14 outputs the content of the operation signal received from the power supply managing unit 13, to the storage unit 15. Further, the control unit 14 analyzes the operation signal received from the power supply managing unit 13. When the operation on the operation unit 11 satisfies a predetermined condition, the control unit 14 controls the wireless transmission unit 17 to transmit the information corresponding to the content of the operation signal stored in the storage unit 15, for example, the wireless signal including the content itself of the operation signal.

The storage unit 15 is a flash memory, for example, operates by using the electric power generated by the power generating unit 12, and nonvolatilely stores the content of the operation signal, received from the control unit 14, of the power supply managing unit 13.

Specifically, in the case where the operation signal expresses the pressing of the number button in the operation unit 11, the control unit 14 writes the number of the number button into the storage unit 15.

Further, in the case where the operation signal expresses the pressing of the transmission button 32 in the operation unit 11, the control unit 14 supplies electric power to the wireless transmission unit 17 by turning on the switch 16.

Next, when the wireless transmission unit 17 receives power supply and becomes in the state of generating and transmitting a wireless signal, the wireless transmission unit 17 outputs a start completion notification to the control unit 14.

Next, the control unit 14 receives the start completion notification from the wireless transmission unit 17, reads the information written by the control unit 14 into the storage unit 15, that is, the information of one or a plurality of numbers stored in the storage unit 15, and outputs the read information to the wireless transmission unit 17. Further, the control unit 14 outputs the information necessary for transmitting a wireless signal, to the wireless transmission unit 17.

Next, the wireless transmission unit 17 generates a wireless signal including the information received from the control unit 14, and transmits the wireless signal to the receiving unit 151 via the antenna 18.

When the transmission of the wireless signal is completed, the wireless transmission unit 17 outputs a transmission completion notification to the control unit 14.

Next, the control unit 14 receives the transmission completion notification from the wireless transmission unit 17, and turns off the switch 16 so that the power supply to the wireless transmission unit 17 is stopped. Accordingly, the wireless transmission unit 17 can be started only when the transmission of a wireless signal is necessary, and wasting of the energy stored in the power storage element 23 can be prevented.

Further, in response to the completion of transmission of the wireless signal by the wireless transmission unit 17, the control unit 14 erases the content of the operation signal stored in the storage unit 15, that is, the information of one or a plurality of numbers input by the user.

Further, also in the case where the operation signal expresses the pressing of the clear button 31 in the operation unit 11, the control unit 14 erases the content of the operation signal stored in the storage unit 15.

The control unit 14 is not limited to be configured to transmit a wireless signal when the transmission button 32 in the operation unit is pressed. The control unit 14 may be configured to transmit a wireless signal which includes the number of a button which is pressed at a predetermined number of times, when a number button is pressed at the predetermined number of times, for example.

Figure 4:
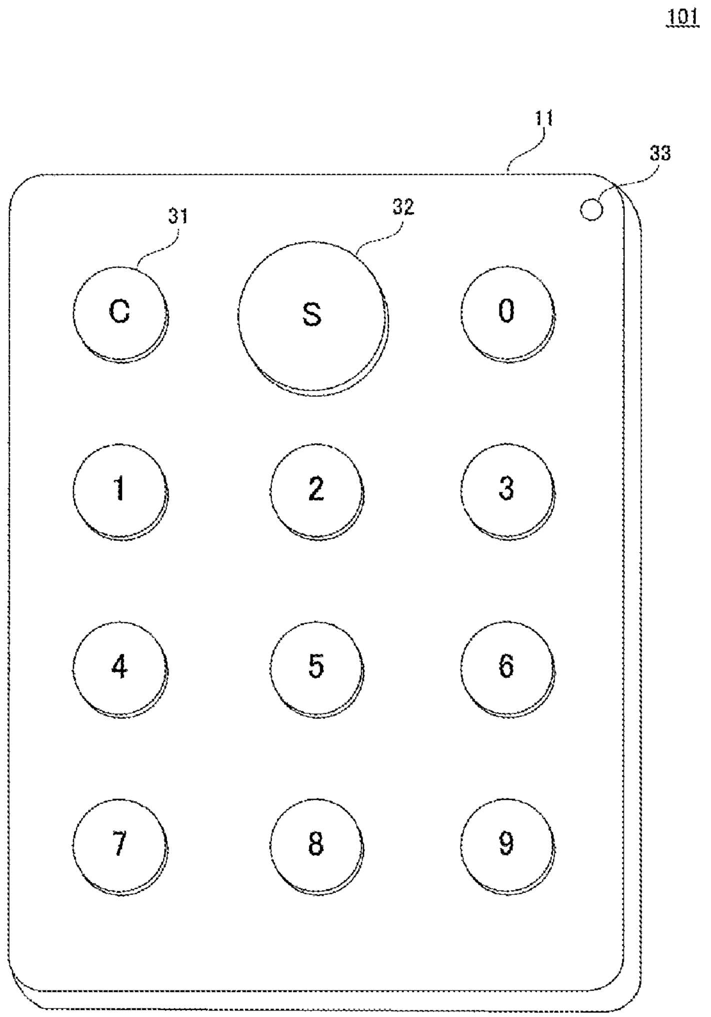
FIG. 4 is a diagram illustrating other example of an operation unit of a remote controller according to the first embodiment of the present invention.

FIG. 4 is a diagram illustrating other example of an operation unit of a remote controller according to the first embodiment of the present invention.

Referring to FIG. 4, the operation unit 11 in the remote controller 101 includes a plurality of buttons having different sizes.

When a larger button is pressed in the operation unit 11, the control unit 14 controls the wireless transmission unit 17 to transmit the wireless signal including the information corresponding to the content of the operation signal stored in the storage unit 15.

Specifically, out of the buttons in the operation unit 11, the transmission button 32 is the largest. As described above, in the case where the transmission button 32 is pressed, much electric power is necessary in the remote controller 101 to read information from the storage unit 15 and generate and transmit a wireless signal.

As described above, by configuring the button that becomes a trigger of the wireless signal transmission operation to be larger than other buttons, the power generating element 22 can generate larger electric power, and the wireless signal transmission operation can be executed more securely.

It is desired to provide an excellent remote control system, by improving the function, convenience, and the like of the remote controller that utilizes the energy harvesting.

On the other hand, in the remote controller according to the first embodiment of the present invention, the power generating unit 12 generates electric power by the operation on the operation unit 11. The power supply managing unit 13 operates by using the electric power generated by the power generating unit 12, and can output an operation signal of a kind corresponding to the content of each operation performed on the operation unit 11. The storage unit 15 operates by using the electric power generated by the power generating unit 12, and nonvolatilely stores the content of the output signal of the power supply managing unit 13, that is, the content of the operation signal. Further, the control unit 14 operates by using the electric power generated by the power generating unit 12. When the operation on the operation unit 11 satisfies a predetermined condition, the control unit 14 controls the wireless transmission unit 17 to transmit the wireless signal including the information corresponding to the content of the operation signal stored in the storage unit 15.

As described above, the remote controller according to the first embodiment of the present invention stores the content of the operation on the operation unit 11, in the storage unit 15, by using the electric power generated by the operation. When the content of the operation on the operation unit 11 satisfies a predetermined condition, the remote controller transmits the wireless signal including the information corresponding to the stored operation content, by using the electric power generated by the power generating unit 12, for example. By this configuration, transmitting a wireless signal each time when operation occurs on the operation unit 11 can be avoided, and radio wave interference due to transmission of the wireless signal can be reduced while effectively utilizing the electric power generated by the power generating unit 12.

Therefore, in the remote controller according to the first embodiment of the present invention, an excellent remote control system that utilizes energy harvesting can be provided.

Further, in the remote controller according to the first embodiment of the present invention, the control unit 14 erases the content of the operation signal stored in the storage unit 15, in response to the completion of transmission of the wireless signal.

Based on this configuration, unnecessary information can be prevented from being kept held in the storage unit 15, and efficiency of using the storage region of the storage unit 15 can be enhanced.

Further, in the remote controller according to the first embodiment of the present invention, the operation unit 11 includes a plurality of buttons having different sizes. A predetermined condition of transmitting the wireless signal is that a button having a larger size is pressed.

As described above, by configuring the button that becomes a trigger of the wireless signal transmission operation to be larger than other buttons, the power generating unit 12 can generate larger electric power, and the wireless signal transmission operation can be executed more securely.

Next, other embodiment of the present invention will be described with reference to the drawings. The same reference symbols will be attached to identical or corresponding portions in the drawings, and their description will not be repeated.

Second Embodiment

The present embodiment relates to a remote control system that uses reference information as compared with the remote control system according to the first embodiment. The content other than that described hereinafter is similar to that of the remote control system according to the first embodiment.

The remote control system 301 according to the second embodiment of the present invention can be applied to the opening and closing of a gate of a building, a garage, and the like, stop control of a room entrance key, and an elevator to a specific floor, by using the reference information, for example. In the case where requirement for security is low, it is also possible to apply the remote control system 301 according to the first embodiment of the present invention to these applications.

In the remote controller 101 according to the second embodiment of the present invention, the storage unit 15 further nonvolatilely stores the reference information.

In the case where the operation on the operation unit 11 satisfies a predetermined condition, the control unit 14 compares the content of the operation signal with the reference information, the content of the operation signal and the reference information being stored in the storage unit 15. When a result of the comparison satisfies a predetermined condition, the control unit 14 controls the wireless transmission unit 17 to transmit the wireless signal including the information corresponding to the content of the operation signal stored in the storage unit 15.

Specifically, reference information is password information. In the case where the content of the operation signal stored in the storage unit 15 coincides with the password information, the control unit 14 transmits the information corresponding to the content of the operation signal stored in the storage unit 15, for example, the wireless signal including the identification information of the remote controller 101. The reference information is not limited to the password information and may be the ID given to the user or the user name, and the like.

For example, the reference information such as the password information can be registered by the user. Specifically, in the case where the user has pressed the number buttons in the order of "123400", for example, the control unit 14 stores "1234" in the storage unit 15 as reference information, because the number button of zero has been pressed twice.

The control unit 14 is not limited to be configured to transmit a wireless signal in the case where the content of the operation signal coincides with the reference information at all collation times. The control unit 14 can be also configured to transmit a wireless signal in the case where the content of the operation signal coincides with the reference information at a part of the collation times.

Further, the control unit 14 erases the content of the operation signal stored in the storage unit 15, in response to the completion of transmission of the wireless signal. Accordingly, in the case where the user has lost the remote controller 101, for example, the remote controller 101 can be prevented from being utilized by other person.

Figure 5:
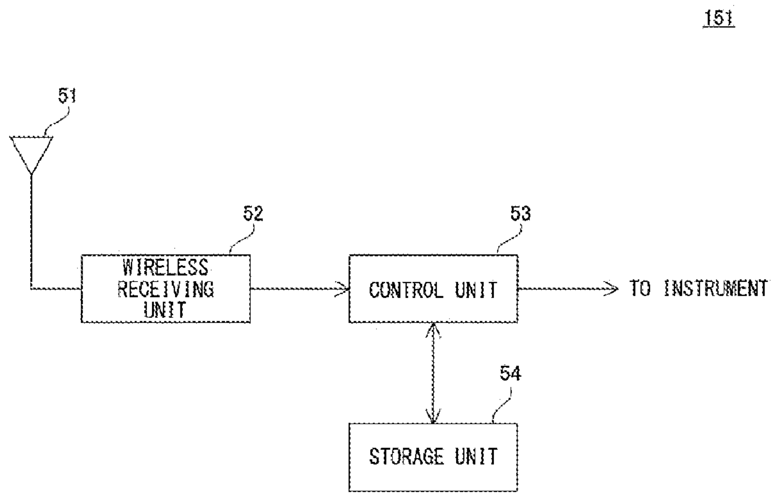
FIG. 5 is a diagram illustrating a configuration of a receiving unit in a remote control system according to a second embodiment of the present invention.

FIG. 5 is a diagram illustrating a configuration of a receiving unit in a remote control system according to a second embodiment of the present invention.

Referring to FIG. 5, the receiving unit 151 includes an antenna 51, a wireless receiving unit 52, a control unit 53, and a storage unit 54.

The wireless receiving unit 52 receives the wireless signal transmitted from the remote controller 101, via the antenna 51, and outputs the information included in the received wireless signal, to the control unit 53.

The control unit 53 outputs a control signal to the instrument 201, based on information received from the wireless receiving unit 52. For example, in the case where the remote control system 301 is applied to the opening and closing of a gate of a building, the control unit 53 outputs a control signal to the instrument 201 that drives the gate, based on the information indicating the opening and closing of the gate received from the wireless receiving unit 52.

In the case where the information transmitted from the remote controller 101 includes the identification information of the remote controller 101, the control unit 53 compares the identification information of the remote controller 101 with the identification information stored in the storage unit 54, for example. In the case where the identification information of the remote controller 101 coincides with the identification information stored in the storage unit 54, the control unit 53 outputs a control signal to the instrument 201 that drives the gate.

In the case where the remote control system 301 is applied to stop control of the elevator at a specific floor, for example, the control unit 53 compares the identification information of the remote controller 101 with a plurality of pieces of the identification information stored in the storage unit 54, for example. In the case where the identification information of the remote controller 101 coincides with any one of the pieces of the identification information stored in the storage unit 54, the control unit 53 outputs a control signal of the content according to the identification information, specifically, a control signal indicating the specific floor, to the instrument 201 that controls the elevator.

Further, the remote control system 301 may be configured to perform the authentication processing by the reference information at the receiving unit 151 side.

That is, in the remote controller 101, when the operation on the operation unit 11 satisfies a predetermined condition, the control unit 14 controls the wireless transmission unit 17 to transmit the wireless signal including the content of the operation signal stored in the storage unit 15.

In the receiving unit 151, the control unit 53 compares the content of the operation signal which is included in the wireless signal received from the remote controller 101 with the reference information, for example, the password information, which is stored in the storage unit 54. When the content of the operation signal coincides with the password information, the control unit 53 outputs a control signal to the instrument 201.

FIG. 6 is a diagram illustrating an example of information to be transmitted by the remote controller according to the second embodiment of the present invention.

Referring to FIG. 6, the information transmitted from the remote controller 101 includes the identification information of the remote controller 101, and the content of the operation signal, that is, the number input by the user, for example.

In this case, in the receiving unit 151, the control unit 53 compares the content of the operation signal which is included in the wireless signal received from the remote controller 101 with the password information which is stored in the storage unit 54. When the content of the operation signal coincides with the password information, the control unit 53 compares the identification information which is included in the information received from the remote controller 101 with the identification information which is stored in the storage unit 54.

Then, in the case where the identification information of the remote controller 101 coincides with the identification information stored in the storage unit 54, the control unit 53 outputs a control signal to the instrument 201.

Other configurations and operations are similar to those of the remote control system according to the first embodiment, and therefore, a detailed description will not be repeated here.

As described above, in the remote controller according to the second embodiment of the present invention, the storage unit 15 further stores reference information. When the operation on the operation unit 11 satisfies a predetermined condition, the control unit 14 compares the content of the operation signal with the reference information stored in the storage unit 15. In the case where a result of the comparison satisfies a predetermined condition, the control unit 14 controls the wireless transmission unit 17 to transmit the wireless signal.

Based on this configuration, concerning the content of a series of operations on the operation unit 11, a higher-level condition can be set for transmitting a wireless signal. Therefore, the remote controller 101 can exhibit a high performance. Further, as compared with the configuration in which a condition of the content of a series of operations on the operation unit 11 is set to the receiving unit 151, for example, a data length of the information transmitted from the remote controller 101 to the receiving unit 151 can be shortened. Therefore, the radio wave interference can be more reduced. Further, because the content of a series of operations on the operation unit 11 is not transmitted to the outside of the remote controller 101, security can be enhanced.

Further, in the remote controller according to the second embodiment of the present invention, when the operation on the operation unit 11 satisfies a predetermined condition, the control unit 14 controls the wireless transmission unit 17 to transmit the wireless signal including the content of the operation signal stored in the storage unit 15.

As described above, without setting in the remote controller 101 a transmission condition of a wireless signal concerning a relationship between the content of a series of operations on the operation unit 11 and the reference information, a condition of the content of a series of operations on the operation unit 11 can be set in the receiving unit 151, for example. Therefore, a processing of the remote controller 101 can be simplified, and the power generation condition and the like in the remote controller 101 can be reduced.

Further, in the remote controller according to the second embodiment of the present invention, the control unit 14 erases the content of the operation signal stored in the storage unit 15, in response to the completion of transmission of the wireless signal.

With this configuration, efficiency of using the storage region of the storage unit 15 can be enhanced, and security can be improved by preventing the password information such as the code number input by the user from remaining in the remote controller 101.

In the remote controller according to the second embodiment of the present invention, the reference information is password information. In the case where the content of the operation signal stored in the storage unit 15 coincides with the password information, the control unit 14 controls the wireless transmission unit 17 to transmit the wireless signal.

With this configuration, it becomes possible to apply a remote control system to a system that requires high security.

It should be considered that the above embodiment is an exemplification in all aspects and is not restrictive. The range of the present invention is expressed by claims, not in the above description, and is intended to include all changes in the equivalent meanings and range of the claims.

Others

In the above embodiment, the predetermined condition concerning the operation on the operation unit 11 (hereinafter referred to as a "first predetermined condition") includes a case where the control unit 14 of the remote controller 101 is a necessary condition for outputting a transmission instruction to the wireless transmission unit 17 and a case where the control unit 14 of the remote controller 101 is a necessary and sufficient condition.

That is, in the case where the first predetermined condition is a necessary condition, the control unit 14 outputs a transmission instruction to the wireless transmission unit 17 in the case where further the first predetermined condition and other loading condition are satisfied.

Further, in the case where the first predetermined condition is a necessary and sufficient condition, the control unit 14 outputs a transmission instruction to the wireless transmission unit 17 in the case where the first predetermined condition is satisfied.

As detailed examples of the first predetermined condition, the following conditions are included, for example.

1) In the remote controller 101 having the transmission button 32 (refer to FIG. 2 and FIG. 4), the transmission button 32 has been pressed.

2) In the remote controller 101 not having the transmission button 32, operation that expresses a transmission instruction which is set in advance (such as a double click which is a successive pressing of a predetermined button, long-time pressing of a predetermined button, and operating a button of a predetermined number which is set in advance) has been performed.

In the above embodiment, as a loading condition to be added to the first predetermined condition which becomes necessary for the control unit 14 to output a transmission instruction, an authentication condition for evaluating coincidence between the content of the operation on the operation unit 11 and the reference information (hereinafter, referred to as a "second predetermined condition") is employed.

Therefore, in the case where the first predetermined condition is a necessary condition, when the first predetermined condition and the second predetermined condition are simultaneously satisfied, the control unit 14 outputs a transmission instruction to the wireless transmission unit 17.

As a detailed example of the second predetermined condition, the following conditions are included, for example.

1) The content of the operation signal (for example, the button operation of "12345") entirely coincides with the reference information (for example, "12345") that is a code number set in advance.

2) The content of the operation signal (for example, the button operation of "12344") partly coincides with the reference information (for example, "12345") as a code number set in advance.

In the above embodiment, there is exemplified the remote controller 101 which is a type of transmitting a wireless signal to the receiving unit 151 via the antenna 18. However, the remote controller 101 may be a type of transmitting an optical signal to a receiving side. Therefore, the wireless signal in the present specification includes an optical signal, and an electric wave also includes light.

In the above embodiment, it is assumed that large electric power is obtained by pressing the transmission button 32 (refer to FIG. 4) which is larger than other operation buttons.

However, there can be also a case where the size of the button does not necessarily correspond to the size of the power generation amount. For example, in the case where only the performance of the power generating element 22 corresponding to the transmission button 32 having the same size as those of other buttons is set higher than the performance of the other power generating elements 22, large electric power can be also obtained by pressing the transmission button 32. Therefore, the claim of the present application can include the following dependent claim, for example.

The remote controller according to the above claim wherein the operation unit comprises a plurality of kinds of buttons having different power generation amounts accompanied with operation, and the predetermined condition (a first predetermined condition) is that the button of a kind of a larger power generation amount (preferably, a button of a largest power generation amount) is pressed.

REFERENCE SIGNS LIST

11: OPERATION UNIT
12: POWER GENERATING UNIT
13: POWER SUPPLY MANAGING UNIT (SIGNAL GENERATING UNIT)
14: CONTROL UNIT (TRANSMISSION CONTROL UNIT AND ERASING UNIT)
15, 54: STORAGE UNIT
16: SWITCH
17: WIRELESS TRANSMISSION UNIT
18, 51: ANTENNA
21, 21A, 21B, 21C: BUTTON
22, 22A, 22B, 22C: POWER GENERATING ELEMENT
23: POWER STORAGE ELEMENT
31: CLEAR BUTTON
32: TRANSMISSION BUTTON
33: LED
52: WIRELESS RECEIVING UNIT
53: CONTROL UNIT
101: REMOTE CONTROLLER
151: RECEIVING UNIT
201: INSTRUMENT
301: REMOTE CONTROL SYSTEM

The invention claimed is:

1. A remote controller comprising:

a mechanical operation unit that generates mechanical energy by being pressed by a user;

a power generating element that is provided corresponding to the mechanical operation unit and generates electric power by converting the mechanical energy generated by the mechanical operation unit into electric energy;

an electric circuit that operates by using electric power generated by the power generating element and is able to output a signal of a kind corresponding to a content of each operation on the mechanical operation unit;

a memory that operates by using electric power generated by the power generating element and nonvolatilely stores a content of an output signal of the electric circuit;

a wireless transmitter that operates by using electric power generated by the power generating element and transmits a wireless signal including information corresponding to a content of the output signal stored in the memory;

a switch that is provided on a power supply line from the power generating element to the wireless transmitter; and a processor that operates by using electric power generated by the power generating element and is programmed to cause the wireless transmitter to transmit the wireless signal when the operation on the mechanical operation unit satisfies a predetermined condition, and the processor turns on the switch when the operation on the mechanical operation unit satisfies the predetermined condition to supply the electric power generated by the power generating element to the wireless transmitter and turns off the switch in response to completion of transmission of the wireless signal by the wireless transmitter to stop the power supply to the wireless transmitter.

2. The remote controller according to claim 1, wherein the memory further stores reference information, and when the operation on the mechanical operation unit satisfies a predetermined condition, the processor compares the content of the output signal with the reference information, the content of the output signal and the reference signal being stored in the memory, and when a result of the comparison satisfies a predetermined condition, the processor causes the wireless transmitter to transmit the wireless signal.

3. The remote controller according to claim 1, wherein when the operation on the mechanical operation unit satisfies a predetermined condition, the processor causes the wireless transmitter to transmit a wireless signal including a content of the output signal stored in the memory.

4. The remote controller according to claim 1, wherein erases the processor is further programmed to erase a content of the output signal stored in the memory, in response to completion of transmission of the wireless signal by the wireless transmitter.

5. The remote controller according to claim 1, wherein the mechanical operation unit includes a plurality of buttons having different sizes, and the predetermined condition is that the button having a larger size is pressed.

6. The remote controller according to claim 2, wherein the reference information is password information, and the processor causes the wireless transmitter to transmit the wireless signal in a case where a content of the output signal stored in the memory coincides with the password information.

7. A remote control system comprising:

a remote controller that transmits a wireless signal; and a receiving unit that receives the wireless signal from the remote controller and controls an instrument based on information included in the wireless signal received, wherein the remote controller includes:

a mechanical operation unit that generates mechanical energy by being pressed by a user;

a power generating element that is provided corresponding to the mechanical operation unit and generates electric power by converting the mechanical energy generated by the mechanical operation unit into electric energy;

an electric circuit that operates by using electric power generated by the power generating element and is able to output a signal of a kind corresponding to a content of each operation on the mechanical operation unit;

a memory that operates by using electric power generated by the power generating element and non-volatilely stores a content of an output signal of the electric circuit;

a wireless transmitter that operates by using electric power generated by the power generating element and transmits a wireless signal including information corresponding to a content of the output signal stored in the memory;

a switch that is provided on a power supply line from the power generating element to the wireless transmitter; and a processor that operates by using electric power generated by the power generating element and is programmed to cause the wireless transmitter to transmit the wireless signal when the operation on the mechanical operation unit satisfies a predetermined condition, and the processor turns on the switch when the operation on the mechanical operation unit satisfies the predetermined condition to supply the electric power generated by the power generating element to the wireless transmitter and turns off the switch in response to completion of transmission of the wireless signal by the wireless transmitter to stop the power supply to the wireless transmitter.

* * * * *